INVENTOR.
John D. Mc Daniels

BY

*J Maguire*

ATTORNEY

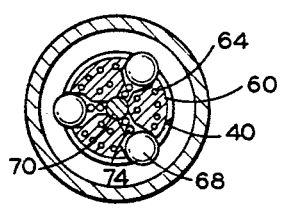
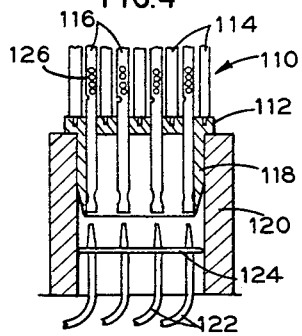
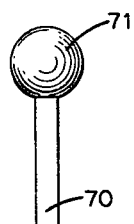
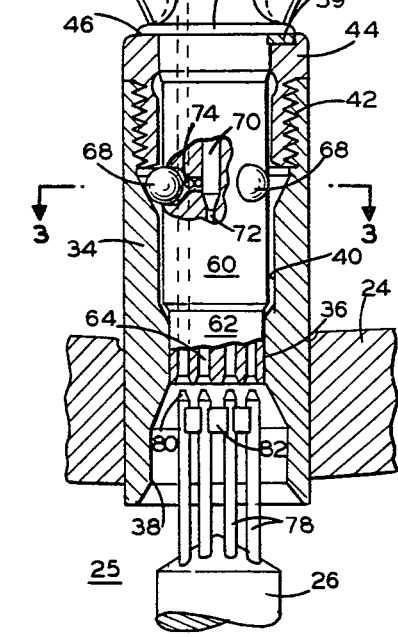
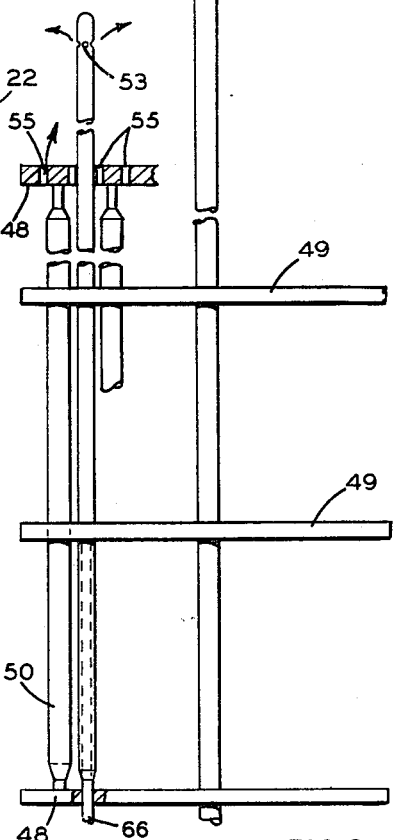

United States Patent Office 3,390,052
Patented June 25, 1968

3,390,052
CONTROL ARRANGEMENT FOR A
NUCLEAR REACTOR
John D. McDaniels, Jr., Lynchburg, Va., assignor to The
Babcock & Wilcox Company, New York, N.Y., a corporation of New Jersey
Continuation-in-part of application Ser. No. 439,227,
Mar. 12, 1965. This application Feb. 16, 1967, Ser.
No. 616,699
7 Claims. (Cl. 176—35)

ABSTRACT OF THE DISCLOSURE

A control member actuating arrangement for a nuclear reactor having a core and having control members movably captured in tubes, including nozzles spaced apart from the lower end openings of the tubes for ejecting control fluid into the tubes against the control members to drive the members substantially axially of the tubes and out of the reactor core.

*Cross-references to related applications*

This application is a continuation-in-part of my copending application, Ser. No. 439,227, filed Mar. 12, 1965, now abandoned.

*Background of the invention and summary*

This invention is directed to a control arrangement for a nuclear reactor and more particularly to a hydraulically operated control arrangement which is not integrally joined to the source of control fluid.

In nuclear reactors having a plurality of fuel elements assembled as a core in an arrangement to provide a critical mass, control of the reactivity is achieved by the use of control elements containing a material which has a high neutron absorption cross-section, which control elements are selectively positioned within the core. As shown in British Patent 951,276 and in U.S. Patent No. 3,257,286, issued June 21, 1966, it is known to utilize control elements in the shape of small balls, which are contained in tubular members extending through the core. These elements are movably positioned within the core by means of a control fluid which passes through the tubes and, when the flow is great enough, causes the elements to move upwardly, in vertically oriented tubes, against the force of gravity and out of the core of the reactor. The elements are either in or out of the reactor core and upon cessation of the control fluid flow the elements fall, under the influence of gravity, back into the core where they absorb a sufficient number of neutrons to regulate reactivity.

In control arrangements of the prior art, the control fluid supply is connected directly to the tubular members in which the control elements are located to provide the necessary flow of control fluid through the tubular members to actuate the control mechanism. These arrangements, it has been found, result in several disadvantages which limit the flexibility of this control arrangement and increase the complexity of the structure. It has been thought necessary to provide a fluid tight connection between the source of control fluid and the tubular members containing the control elements. As a result, with control arrangements of the prior art it is necessary to provide, within the reactor, a connecting means between the control element containing tubes and the source of control fluid, which connecting means require maintenance and provision for accessibility. These connecting means also incorporate sealing surfaces which have to be broken when the reactor is refueled. These surface seals are subject to damage to the mating parts during assembly and disassembly which could necessitate their replacement. Furthermore, close tolerances are necessary in their manufacture, increasing the cost of the elements. Moreover, foreign particles can enter the seal elements which could reduce their effectiveness, requiring great care to minimize such a possibility.

Further difficulties are experienced in control arrangements of the prior art due to the fact that the control element-containing tubes are sealingly connected to the control fluid supply which results in the possibility that a malfunction in the control fluid supply means could restrict the flow of fluid through the control element-containing tubes preventing the insertion of the elements into the core when necessary. Furthermore, to provide the requisite cooling of the control elements necessitates the maintenance of at least a small flow of fluid through the control fluid circuit, even when the control elements are inserted within the core and the reactor is shut down.

Accordingly, the present invention obviates the difficulties of the prior art by providing a control arrangement for a nuclear reactor wherein the tubular members containing the control members are open at both ends. A control fluid supply means is arranged to introduce the control fluid into one end of the tubular member through a nozzle means arranged in substantial axial alignment with the end of the tubular member and spaced therefrom. Thus the tubular member containing the control elements is open at both ends to minimize the possibility of pluggage by foreign particles which would prevent the normal operation of the control element. Furthermore, the reactor coolant fluid, in which the control member is immersed, is free to circulate through the tubular member, cooling the control element regardless of whether or not there is any fluid flow through the control supply circuit. Also, since with this arrangement there is no need for seals between the control fluid supply and the tubular members containing the control elements the fuel elements, in which the control elements are arranged, may be relatively easily moved or replaced.

Furthermore, the present invention provides a nuclear fuel element having a plurality of vertically extending fuel pins supported and aligned and extending upwardly from a horizontally disposed support plate. The requisite number of vertically extending tubular control elements are also supported and aligned by the support plate and extend therethrough. A plurality of coolant flow passages extend through the support plate for the passage of a coolant fluid therethrough and around the outer surfaces of the fuel pins and the tubular control elements. A fuel element support shaft is connected to and extends below the support plate with the support shaft being spaced from the lower surface thereof to permit the passage of the coolant fluid through the flow passages. A fastening device is arranged in the support shaft and extends radially outward from the center thereof to hold the fuel element in position and a centrally disposed fastener actuator rod extends coaxially through the support plate and upwardly through the fuel element to the upper end thereof. A plurality of control fluid passages are arranged to extend axially from the lower end of the support shaft therethrough to connect one with each of the tubular control elements, each of the control fluid passages being open at the lower end of the support shaft to the surrounding space permitting circulation of a coolant fluid therein.

Furthermore, a reactor arrangement is provided wherein a plurality of control fluid supply nozzles are arranged in the lower portion of the reactor in coaxial alignment with the lower ends of the control fluid passages in the aforementioned support shaft. These coolant supply nozzles are spaced from the ends of the control fluid passages and provide a jet of control fluid into the control fluid passages.

Description of drawing

FIG. 2 is an enlarged detail of the lower portion of one fuel element, partly in section, of the reactor illustrated in FIG. 1;

FIG. 3 is a horizontal section of the fuel element taken along line 3—3 of FIG. 2; and FIG. 4 is an alternate embodiment of the present invention;

FIG. 5 is a partial fuel element upper detail.

Description of preferred embodiments

Figure 1:
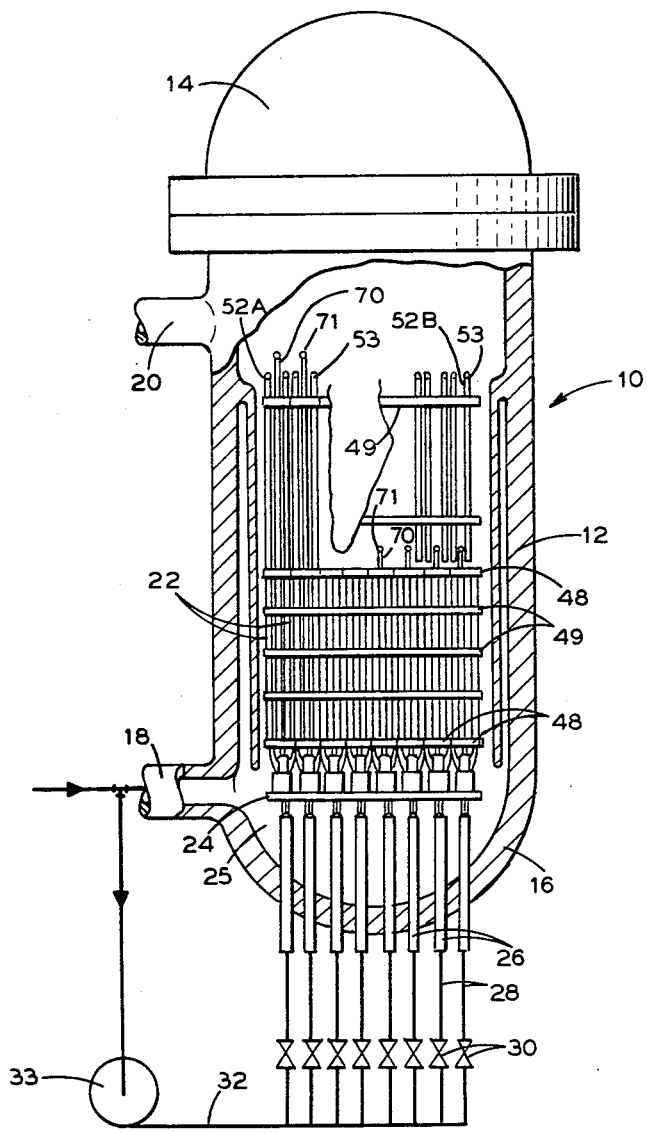
FIG. 1 is an elevation, partly in section, of a nuclear reactor embodying the control arrangement of the present invention.

A nuclear reactor 10 is illustrated in FIG. 1 and comprises a pressure vessel 12 terminating in upper and lower heads 14 and 16, respectively. A coolant inlet 18 and a coolant outlet 20 are arranged through the wall of the pressure vessel. A plurality of fissionable material bearing fuel elements 22 are arranged within the reactor as a core to undergo a self-sustaining fission-type chain reaction. These fuel elements are supported by a fuel element grid plate 24, arranged in the lower portion of the pressure vessel, and extend upwardly therefrom. A plurality of control fluid inlets 26 extend upwardly through the lower head 16 of the pressure vessel into a lower plenum 25 and are connected via lines 28 through valves 30 to a control fluid supply line 32.

Referring now to FIG. 2, an enlarged portion of the lower end of a fuel element 22, shown in FIG. 1, is illustrated supported in the grid plate 24 which is provided with a plurality of fuel element support tubes 34 which pass through and are connected to the grid plate 24. The support tube 34 is provided with a bore 36 near the upper surface of the grid plate 24. The bore is enlarged at the lower end at 38 and at the upper end at 40. Enlarged bore 40 terminates in a threaded portion 42 at the upper end of the support tube 34. An annular insert 44 is threaded into the upper end of the support tube and provides a seating surface 46 for the fuel element as will be described hereinbelow.

The fuel element 22 comprises a horizontally disposed support plate 48 to which a plurality of vertically extending fuel pins 50 are attached which extend upwardly from the upper surface of the support plate 48. A plurality of vertically extending tubular control elements 52 are supported and aligned by the support plate 48 and extend therethrough. The tubular control elements also extend upwardly beyond the upper end of the fuel pins. Intermediate spacer grids 49, as for example grids shown in the patent to Jabsen, No. 3,205,144, are provided to hold the fuel tubes and control elements. A fuel element support shaft 54 is centrally disposed below the support plate 48 and is connected thereto by a plurality of webs 56 which are spaced around the periphery of the support plate and permit coolant flow upwardly through coolant flow openings (not shown) through the support plate about the outer surfaces of the fuel pins 50 and the tubular control elements 52 and out coolant flow passages 55 above the fuel pins. The support shaft 54 is provided with a flange portion 58 which mates with and seats upon the seating surface 46 of the annular insert 44. A key 59 extends from the lower surface of flange 58 which seats in a corresponding slot in the upper surface of the insert 44 to positively align the fuel element. The support shaft extends downwardly from flange 58 and has a portion 60 of reduced outer diameter extending through the portion 40 of the support tube having an enlarged bore. The lowermost end 62 of the support shaft has a diameter substantially equal to the bore 36 of the support tube 34 to provide additional vertical support. A plurality of control fluid passages, or passageways 64 extend upwardly through the support shaft 54 from the lowermost surface thereof and are connected via lines 66 at the upper end of the support shaft to the lowermost ends of the tubular control elements 52.

A fuel element hold-down latch mechanism is provided in the support shaft 54 and comprises a plurality of locking elements 68 which are spaced around the outer surface thereof. An actuating member 70 extends coaxially downwardly through the fuel element 22 and through the support shaft 54 and has, at its lower end, a portion of reduced diameter 72. The actuating member may be axially moved by a lifting means 71 connected thereto. The lifting means 71 is located at the upper end of the fuel element and is raisable to disengage the reduced diameter portion 72 of the member 70 from the locking elements 68. When the actuating member is pushed downward the larger diameter portion thereof forces the locking elements 68 outwardly to engage the lower surface of the annular insert 44 positively locking the fuel element in position, as shown in FIG. 2. It should be noted that the arrangement permits a fuel element to be inserted in the reactor core and locked securely in place from above. Downward force applied to the lifting means moves the balls 68 radially outwardly into locking engagement with the adjacent receptacles. Upward force applied to the lifting means causes the balls to retract and release the fuel element. The locking elements 68 may either be spherical members, as shown, actuated by a series of smaller spherical members 74 or they may be substantially cylindrical plungers, with the inner ends thereof contacting the actuating member 70.

A control fluid inlet 26, illustrated in FIG. 1, is aligned, one with each fuel element support tube 34, as shown in FIG. 2. The control fluid inlet has a plurality of conduits 78 extending therethrough. Each of the conduits extends beyond the upper end of the control fluid inlet and terminates in a nozzle 80 which is directed into the lower open end of the fluid passages 64 in the support shaft 54. A support and spacer grid 82 may be provided at the upper ends of conduits 78 to positively align the nozzles and to prevent vibration.

The tubular control elements 52 are open-ended elements. Each element 52 contains a control member which is movable axially therein. The control members are formed of any suitable neutron absorbing material, as is well known in the art, to provide reactivity control. These members may either comprise a plurality of spherical elements or a single elongated pin 83 which may be moved axially of the tubular control elements 52 under the influence of an actuating fluid as will be fully described hereinbelow. The length of the members in the tubular elements 52 are substantially equal to the active length of the fuel pins 50 and the tubular elements 52 extend above the end of the active fuel pins a length at least equal to the length of the control members. The portion of the tubular element 52 extending above the active fuel may be part of the fuel element as shown in FIG. 1 as 52A or may be part of a large single assembly as noted at 52B which is removed as a unit prior to loading or unloading new fuel elements into or from the pressure vessel 12. A restraint means is provided in the upper ends of the tubular elements to prevent the control members from being driven out by the actuating fluid. Openings 53 are provided, however, in the upper ends of the tubular elements to permit fluid flow therethrough. In the control arrangement of the present arrangement the control members may be positioned either in the lower ends of or the upper ends of the tubular members 52. Thus, the control members 83 are either in or out of the reactor core since the upper ends of tubular members 52, as previously noted, extend beyond the upper ends of the fuel pins.

A control fluid, which may be the same as the reactor coolant fluid, is supplied to the control fluid supply line 32 (see FIG. 1). For example, the supply line may be connected through a pump 33 to the reactor coolant inlet 18. The pump 33 supplies the control fluid to the control supply line 32 from the reactor coolant inlet at a pressure substantially above the reactor coolant inlet pressure. The coolant is then introduced into conduits 78 by selectively opening valves 30 in lines 28 to the control fluid inlets 26. The control fluid then passes through the conduits 78 and, upon discharge through nozzles 80 in the upper ends of the conduits 78, is introduced into the control fluid passageways 64, passing through lines 66 to the tubular control elements 52 where the fluid pressure drives the control members 83 to the upper ends of the tubular elements 52. It is seen that the lower ends of each of the control fluid passageways 64 are opened to the plenum so that coolant can circulate through the tubular control elements when control fluid is not being jetted into the control fluid passageways 64 from the nozzles 80. The nozzles 80 are spaced apart from the inlets of the control fluid passageways. It should be appreciated that each fuel element has its own tubular control element containing a movable neutron absorbing member. Further, each element is open via the control fluid passageways 64 to the plenum as well as to the jetting control fluid. Since coolant can circulate through a control element when control fluid is not being jetted into the control fluid passageway, the coolant fluid passageways are dual purposed. While only one valve 30 is shown leading to the control fluid inlets 26, each conduit 78 may be provided with a separate valve so that each control element within a fuel element may be selectively actuated. In this manner, with each member containing a relatively small amount of control material, a high degree of flexibility of reactivity control and power distribution within the core may be attained. Each of the valves 30 may be solenoid operated, being either open or closed. When the valve is open, control fluid is supplied to the tubular control elements 52 driving the control members out of the core, when the valve 30 is closed, the control fluid flow is terminated and the control members drop, under the influence of gravity, back into the reactor core.

As illustrated, the control fluid passages 64 in the fuel element support shaft 54 are not directly connected to the control fluid conduits 78 so that upon termination of the control fluid flow reactor coolant may still enter the lower end of the control fluid passages 64 from the plenum 25 beneath the grid plate 24 and thence circulate upwardly through the tubular control elements 52 cooling the control members therein. However, the pressure drop of the coolant fluid between the bottom and the top of the reactor core is not sufficiently great to drive any of the control members out of the core. The only way that movement of the control members is possible is under the influence of the pressurized control fluid. As previously noted, with the arrangment of the present invention, critical alignment and fitting is not necessary. If the nozzles 80 provide a jet of control fluid near the passages 64 any slight misalignment can be readily accommodated. Furthermore, there is no seal connection required between the control fluid supply and the tubular control elements. As a matter of fact, the present arrangement has the added advantage over arrangements of the prior art, which have sealed connections, in that the reactor coolant fluid itself may be used to cool the control members while they are in the core and the control fluid supply is shut off.

An alternate embodiment of the present invention is illustrated in FIG. 4 showing the reactor control of the present invention applied to a reactor wherein the fuel elements are supported by a grid plate in a conventional manner. In this arrangement the fuel element 110 is provided with a lower support plate 112 on which the fuel members 114 and the control elements 116 are supported. The support plate 112 is provided with a nozzle 118 extending downwardly therefrom which fits into an opening within the lower grid plate 120 of the reactor. The control fluid nozzles 122 extend from below the grid plate 120 upwardly into the opening therein and direct control fluid flow into the lower ends of control elements 116 which extend through the support plate 112. A support or alignment member 124 may be provided to support and align the control fluid nozzles 122. In this illustration the control members are illustrated as a plurality of balls 126 in the control elements 116.

In both of the arrangements illustrated means may be provided in the upper and lower ends of the control elements which act as snubbers to decelerate the control members at the end of travel.

In addition to the advantages previously listed for the control arrangement of the present invention, each fuel element is provided with a plurality of individually controllable control members which are permanently part of the fuel element. In this way, each and every fuel element within a reactor core may be identical as to geometry so that no problems are incurred when relocating the fuel elements within the reactor core. Furthermore, upon removal of the fuel elements to a storage area no problems concerning inadvertent criticality are encountered since each fuel element contains more than sufficient control material to prevent any chain reaction from occurring.

A further advantage of the present invention over control arrangements of the prior art result from the fact that the control elements are always open to fluid flow so that an obstruction in the control fluid supply line would not prevent the insertion of the control members by trapping a quantity of fluid between the lower ends of the control members and the lower end of the control element tube.

Furthermore, inasmuch as the control members are either in or out of the reactor core, with no possibility of remaining in an intermediate position, a simple position indication system is possible. For example, a single position indication sensor may be located at the bottom of the fuel element to indicate when the control member is in the lowermost position. When the sensor indicates that the control member is not in the lowermost position, the control member must be at the upper end of the tubular control member.

Moreover, the present control drive system, actuated by the flow of a fluid, makes it possible to group many of the control fluid supply lines into sub-assemblies requiring fewer penetrations through the reactor pressure vessel wall.

What is claimed is:

1. In a nuclear reactor the combination of a core having a plenum for coolant fluid at the lower end thereof and containing a plurality of elongated separate fuel elements, each fuel element comprising a support plate, a plurality of fuel pins supported and aligned by said support plate and extending upwardly therefrom, a plurality of open-ended tubular control elements supported and aligned by said support plate and extending therethrough, a neutron absorbing member movably disposed in each of said tubular control elements, a plurality of coolant flow passageways extending through said support plate for passage of a coolant fluid therethrough around the outer surfaces of said fuel pins and said tubular control elements, a plurality of control fluid passageways extending downwardly from the lower ends of said tubular control elements, each of said control fluid passageways being open at the lower end to said plenum, thereby permitting circulation of said coolant fluid through said control fluid passageways, and control fluid supply means spaced apart from the lower end of some of the control fluid passageways for directing control fluid thereinto.

2. The combination according to claim 1 wherein each fuel element includes a shaft disposed below said support plate in spaced relation thereto, and structure connected between said shaft and said support plate for supporting said support plate on said shaft and permitting the flow of coolant from said plenum to said coolant flow passageways, and wherein said control fluid passageways extend through said shaft and terminate at the lower end thereof.

3. A nuclear fuel element for use in a nuclear reactor including a core having a plenum for coolant fluid at the lower end thereof, said fuel element comprising a horizontally disposed support plate, a plurality of vertically extending fuel pins supported and aligned by said support plate and extending upwardly therefrom, a plurality of vertically extending open-ended tubular control elements supported and aligned by said support plate and extending therethrough, a neutron absorbing member movably disposed in each of said control elements, a plurality of coolant flow passageways extending through said support plate for passage of a coolant fluid therethrough around the outer surfaces of said fuel pins and said tubular control elements, a fuel element support shaft disposed below said support plate and spaced from the lower surface of said support plate, structure connecting said support plate to said support shaft for support thereon and arranged to permit the passage of a coolant fluid through said flow passageways, said support shaft having a fastening device extending radially outward from the center thereof to hold said fuel element in position, a centrally disposed fastener actuator rod extending coaxially through said support shaft and upwardly through said support plate to the upper end of said fuel element, a plurality of control fluid passageways extending axially from the lower end of said support shaft therethrough and connecting one with each of said tubular control elements, each of said control fluid passageways being open at the lower end of said support shaft to permit circulation of said coolant fluid through said control fluid pasageways.

4. The combination according to claim 1 wherein said control fluid supply means is arranged to introduce control fluid into the lower ends of some of said control fluid passageways, said control fluid supply means having nozzle means for the respective control fluid passageways aligned with and spaced from the associated lower ends of the respective control fluid passageways.

5. The combination according to claim 4 wherein said nozzle means are arranged to permit entry of said control fluid into the lower ends of said control fluid passageways for delivery to said tubular control elements during operation of said control fluid supply means.

6. The combination according to claim 5 wherein said tubular control elements extend beyond the upper end of said fuel pins a distance sufficient to accommodate said neutron absorbing members above the level of said fuel pins.

7. The combination according to claim 6 wherein said control fluid supply means includes valve means for regulating the flow of control fluid through said nozzle means, wherein said control fluid supply means introduces said control fluid into the lower end of said control fluid passageways at a pressure substantially above the pressure of said coolant fluid, wherein each of said neutron absorbing members moves upwardly in its tubular control element to a level above said fuel pins in response to control fluid pressure substantially above the pressure of said coolant, and wherein said neutron absorbing members are at the level of said fuel pins when the control fluid pressure is not substantially above the pressure of the coolant fluid.

References Cited

UNITED STATES PATENTS

| 3,087,881 | 4/1963 | Treshow | 176—54 |
| 3,228,847 | 1/1966 | Parkinson et al. | 176—22 |
| 3,257,286 | 6/1966 | Ryon et al. | 176—22 |

FOREIGN PATENTS

| 796,966 | 6/1958 | Great Britain. |
| 907,458 | 10/1962 | Great Britain. |
| 951,276 | 3/1964 | Great Britain. |

BENJAMIN R. PADGETT, *Primary Examiner.*

H. E. BEHREND, *Assistant Examiner.*